Patented Oct. 7, 1941

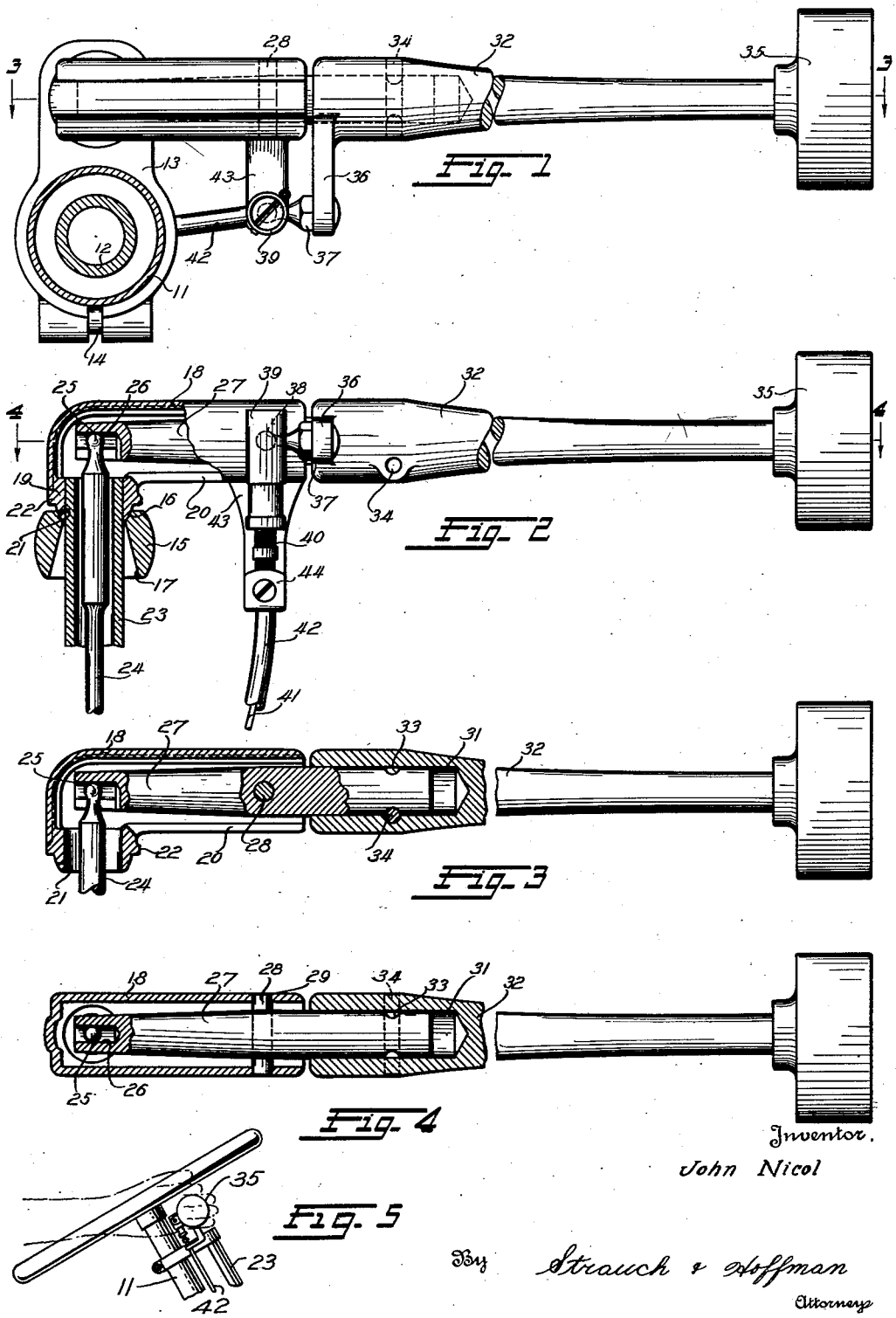

2,257,852

UNITED STATES PATENT OFFICE 2,257,852

COMBINATION TRANSMISSION AND THROTTLE CONTROL

John Nicol, Detroit, Mich., assignor to Divco-Twin Truck Company, Detroit, Mich., a corporation of Michigan Application November 30, 1938, Serial No. 243,252

7 Claims. (Cl. 74—472)

My invention relates to multiple function control devices and is more particularly concerned with combined transmission and throttle control devices for automotive vehicles.

Automotive vehicles in general use today are the results of progressive designing and planning calculated to provide comfort, ease of operation, improved appearance and other desirable qualities.

Many of the new designs in current use today eliminate the old form of transmission control lever which extended upwardly from the gear box at the middle of the front floor of the vehicle and now provide a short, rigid gear shift lever extending laterally from the steering post below the steering wheel.

In the present invention this new design of transmission control has been modified to further simplify the vehicle controls by embodying a throttle control mechanism at the transmission control adjacent the steering wheel so that steering, throttle and transmission controls are all operable by one hand of the operator from substantially only one position of that hand.

With the above in mind it is a major object of the present invention to provide a novel multiple function control system for an automotive vehicle which is conveniently accessible to the operator, provides additional foot or load space at the front floor of the vehicle, is simple and inexpensive in design and provides a neat and pleasing appearance within the vehicle. Specifically, the control system operates the transmission and engine throttle of the vehicle.

A further object of the invention is to provide a novel combination transmission and throttle control arrangement mounted upon a relatively rigid part of a vehicle a substantial distance above the floor of the vehicle to provide ample foot or load space at the floor. Specifically this control arrangement is mounted on the steering post just below the steering wheel.

It is a further object of the invention to provide a novel vehicle control embodying a swingable transmission control lever extending laterally from the steering post and an operating handle for the lever which is also operable to control the engine throttle. Specifically the operating handle is provided with a suitable Bowden wire connection or the like to the carburetor of the engine.

A further object of the invention is to provide a novel compound lever for operating the transmission and engine throttle of an automotive vehicle wherein manipulation of the lever to actuate the transmission is substantially ineffective upon the throttle and vice versa.

Further objects of the invention will presently appear as the description proceeds in connection with the appended claims and the annexed drawing in which Figure 1 is a plan view, partly in section, illustrating an embodiment of the invention comprising a combined transmission and throttle control mounted upon the steering post of an automotive vehicle.

Figure 2 is a side elevation, with parts broken away and partly in section, of the control of Figure 1.

Figure 3 is a section taken generally along line 3—3 of Figure 1.

Figure 4 is a fragmentary view partly in section taken generally along line 4—4 of Figure 2.

Figure 5 is a diagrammatic view illustrating the manner in which the throttle control may be manipulated by the operator's hand while the latter rests partly on the steering wheel.

Referring to Figure 1, a steering post 11, which is rigidly supported within an automotive vehicle in any manner well known in the art, houses the usual steering rod 12 which is ordinarily provided at its top end with a conventional steering wheel and at its bottom end with suitable connections for operating the steering wheels of the vehicle.

A bifurcated bracket 13 embraces post 11 just below the steering wheel (not shown) and is made rigid with post 11 by tightening suitable bolt means 14 so as to draw the arms of bracket 13 tightly about post 11.

At the outer end of bracket 13 is a socket portion 15 formed at its upper edge with a generally spherical concave seat 16 and provided with a downwardly and outwardly tapered bore 17.

A hollow lever 18 is provided at one end with a substantially normally disposed fitting 19 formed with a generally convex seat portion 21 adapted to interfit with seat 16 on the bracket. Fitting 19 is formed with a circumferential flange 22 above seat 21. Fitting 19 is hollow and is adapted to receive the end portion of a generally vertically disposed hollow tube 23. Tube 23 and fitting 19 are preferably rigid with each other, being provided with cooperating screw threads or pressed in tight frictional engagement or the like. Fitting 19 may be integral with or rigidly attached to lever 18 in any suitable manner.

A rod 24, appreciably smaller in diameter than the interior of tube 23 extends upwardly through tube 23 and is formed at its upper end with a ball 25 fitting within a socket 26 at one end of a rock arm 27 axially disposed within lever 18. Rod 24 is provided with a slender neck portion which extends through a slotted wall of socket 26 and ball 25 is larger than the slot in the wall so that vertical motion in both directions is imparted to rod 24 when arm 27 is rocked about its pivot as will later be described.

Tube 23 extends downwardly adjacent the steering post to the floor of the vehicle where both tube 23 and rod 24 are connected operatively to a suitable transmission mechanism. Since the specific connections of tube 23 and rod 24 to the transmission mechanism are well known and in general use today and do not concern applicant's invention it is not necessary to describe the same fully here. It is believed sufficient to state that oscillation of lever 18 in the plane of the paper in Figure 1 actuates tube 23 to effect fore and aft motion of the gear selector mechanism while rocking of arm 27 about pin 28 produces lateral or selective motion of the gear selector mechanism. Lever 18 is slotted at 20 directly below arm 27 to permit free rocking motion of arm 27.

Since tube 23 extends closely adjacent the steering post ample floor space is provided adjacent the steering post. This is desirable in passenger cars for increased leg room and in certain trucks for increased load floor space.

Rock arm 27 is provided with a pivot pin 28 which extends substantially diametrically across lever 18 adjacent its free end. Pin 28 is journaled in suitable apertures 29 in the walls of lever 18. If desired, pin 28 may be rigid with lever 18 and rotatably connected with rock arm 27.

Arm 27 extends beyond the open end of lever 18 and fits within an axial socket 31 in a handle member 32. Within the socket arm 27 is provided with a circumferential groove 33 which cooperates with a round key or pin 34 on lever 18 to prevent axial displacement of handle 32 along arm 27. Handle 32 can be removed from arm 27 when pin 34 is removed.

Socket 31 preferably fits smoothly about the outer surface of arm 27 so that handle 32 may be rotated axially, this rotation being permitted by pin 34 and groove 33. Preferably socket 31 is slightly binding frictionally on arm 27 so that handle 32 cannot be accidentally rotated by ordinary gear shift manipulations and so that a fixed position of rotation of the handle may be maintained.

Handle 32 is provided at its outer end, which is preferably disposed just adjacent the steering wheel of the vehicle so that it can be easily reached by the fingers of an operator whose hand is resting on the steering wheel, with a knurled grip portion 35, as shown in Figure 5.

Handle 32 is formed with a preferably integral eccentric formation comprising a lug 36 extending substantially radially of the axis of the handle. A ball headed stud 37 of any suitable design is secured to the outer end of lug 36 and extends toward the steering post where its ball head 38 is received with a suitable socket 39. Any other suitable substantially universal connection may be used between the flexible cable 41 and lug 36.

Socket 39 is threadedly secured upon a suitable fitting 40 brazed or otherwise fixed upon the upper end of a stranded or flexible cable 41 which extends slidably through an armored cable or conduit 42 to be connected operatively to the engine throttle (not shown). Any equivalent Bowden wire or cable mechanism can be used for this purpose.

A downwardly and laterally extending projection 43, rigid and preferably integral with lever 18, is provided at its outer end with a clamping device 44 for seating conduit 42 rigidly thereupon.

As shown in Figures 1 and 2 an axis of the universal connection at 38 preferably lies in the same plane as the axis of the pivot 28 for a purpose to be later explained. Conduit 42 is preferably clamped to the steering post or attached to the body of the vehicle in some suitable manner so that it does not interfere with operation of the vehicle.

In operation gear shifting manipulations are carried out by grasping handle grip 35 and actuating the same to cause tube 23 and rod 24 to perform their respective gear shifting functions just as though a conventional shift lever were used instead of the compound throttle connected lever of the invention.

During these gear shifting manipulations accidental rotation of handle 32 upon arm 27 is prevented by the relatively tight frictional fit of arm 27 in socket 31. However, whenever it is desired to manipulate the engine throttle, especially during gear shifting manipulation, it is necessary only to rotate handle 32 about its axis on arm 27.

With reference to Figures 1 and 2, rotation of handle 32 in a clockwise direction, looking from right to left, will cause socket 39 to be displaced upwardly through the medium of lug 36, stud 37 and ball head 38. Since socket 39 is fixed to the flexible cable 41, the latter is pulled along conduit 42 to actuate the engine throttle toward open position. Conduit 42 is fixed to projection 43 and therefore cannot move with respect to lever 18.

With the handle 32 in the throttle idling position as illustrated in Figures 1 and 2, the center of ball 39 is aligned with the axis of pivot pin 28 so that no gear shifting manipulations of the lever 18 and rock arm 27 have any tendency to operate the throttle control.

As handle 32 is rotated to open the throttle the center of ball 39 remains in the same general plane as the axis of pivot 28 but of course is no longer aligned therewith so that manipulation of the rock arm 27 with the throttle handle rotated to open position may have some slight tendency to actuate the throttle control.

However, the angular movement required of handle 32 during gear shifting manipulations is very small and the effect of manipulating rock arm 27 under these conditions is hardly noticeable and can be easily compensated if desired by rotation of handle 32 in the opposite direction. In any event the above described arrangement enables the throttle to be operated entirely independently of the gear shift mechanism and enables the gear shift mechanism to be manipulated without any appreciable effect on the throttle mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A combined throttle and transmission operating mechanism comprising a swingably mounted lever adapted to be operatively connected to the transmission, a manually operable handle member movably mounted on the free end of said lever, a flexible throttle actuating cable supported adjacent an end by said lever and a universal connection between said cable and handle member.

2. In an engine propelled vehicle having a steering post and a variable speed transmission, a combined throttle and transmission operating mechanism comprising a swingably mounted laterally projecting lever on said post adapted to be operatively connected to the transmission, an operating handle adjacent the free end of said lever whereby changes in said transmission may be effected by grasping said handle to swing said lever, throttle actuating means carried by said lever in spaced relation to said handle, said handle being rotatable with respect to said lever and being connected to actuate said throttle actuating means without operating said transmission, the connection between said handle and the throttle actuating means including a universal joint supported by said lever and being associated with said lever and handle in such a manner that movements of the lever to effect said changes in the transmission do not cause appreciable operative movement of said throttle control.

3. A multiple function control mechanism comprising a swingable control lever having a manually operable member rotatably mounted thereupon, a projection extending from said lever and a hollow conduit secured to said projection, a radial arm on said member and control means universally connected to said arm adapted to extend through said conduit, said control means and said control lever performing different functions.

4. A combined transmission and throttle control mechanism comprising a swingable transmission control lever and a manually operable member rotatable upon said lever, a projection extending from said lever and a hollow conduit secured to said projection, a flexible throttle control element extending through said conduit and universally connected to said member eccentrically of its axis of rotation so that rotation of said member actuates the throttle independently of the transmission.

5. In combination a swingably mounted hollow lever, a rock arm pivoted interiorly of lever and extending beyond an open end thereof, a manually operable member mounted upon said arm and rotatable about the longitudinal axis of said arm, a projection rigid with said lever and a hollow conduit secured to said projection, an eccentric formation on said member, a flexible throttle control element extending through said conduit provided with a universal connection to said formation, said connection and the pivot axis of said arm being substantially in the same plane.

6. In an engine propelled vehicle having a steering post and a variable speed transmission, a laterally projecting transmission control lever freely swingably mounted on said post, a rockable arm on said lever and a movable handle member on said arm, a throttle operating element having an end supported by said lever and a motion transmitting universal connection between said element and rockable arm, said connection being of such nature and so located that control of the throttle is substantially undisturbed by transmission control movements of said lever.

7. In an engine propelled vehicle having a steering post and a variable power transmission means between the engine and the driven wheels of the vehicle, a transmission operating lever swivelly mounted at said post and extending laterally therefrom, a handle member telescopingly and rotatably mounted on said lever at its free end, a projection rigid with said lever and throttle operating means carried by said projection, an eccentric portion at the inner end of said handle, and a ball and socket connection between said eccentric portion and said throttle operating means.

JOHN NICOL.